(12) United States Patent
Thayyullathil et al.

(10) Patent No.: US 11,781,799 B2
(45) Date of Patent: Oct. 10, 2023

(54) DEVICE AND METHOD FOR MOUNTING DOOR TRIM

(71) Applicant: Viking Range LLC, Greenwood, MS (US)

(72) Inventors: Jemsheer Thayyullathil, Greenwood, MS (US); Dustin Caruso, Greenwood, MS (US)

(73) Assignee: VIKING RANGE, LLC, Greenwood, MS (US)

( * ) Notice: Subject to any disclaimer, the term of this patent is extended or adjusted under 35 U.S.C. 154(b) by 665 days.

(21) Appl. No.: 16/819,846

(22) Filed: Mar. 16, 2020

(65) Prior Publication Data

US 2020/0292227 A1 Sep. 17, 2020

Related U.S. Application Data

(60) Provisional application No. 62/819,191, filed on Mar. 15, 2019.

(51) Int. Cl.
*F25D 23/02* (2006.01)
*B23P 15/26* (2006.01)
*B29C 65/56* (2006.01)

(52) U.S. Cl.
CPC ............ *F25D 23/028* (2013.01); *B23P 15/26* (2013.01); *B29C 65/56* (2013.01)

(58) Field of Classification Search
CPC ....... F25D 23/028; F25D 23/02; B29C 65/56; B23P 15/26
USPC ..... 403/409.1, 397, 399, 349, 251, 326, 250
See application file for complete search history.

(56) References Cited

U.S. PATENT DOCUMENTS

| | | | | |
|---|---|---|---|---|
| 3,648,411 A | * | 3/1972 | Saunders | E05B 1/0015 49/460 |
| 4,015,760 A | * | 4/1977 | Bott | B60R 9/04 D8/382 |
| 4,066,285 A | * | 1/1978 | Hall | B60R 13/04 52/716.6 |
| 4,087,141 A | * | 5/1978 | Roberts | A47B 95/02 16/412 |
| 4,265,383 A | * | 5/1981 | Ferguson | B60R 9/04 52/716.6 |
| 4,408,432 A | * | 10/1983 | Carter | E05B 1/0015 428/61 |
| 4,619,847 A | * | 10/1986 | Jackson | B29C 67/0044 264/328.8 |

(Continued)

*Primary Examiner* — Jason L Vaughan
(74) *Attorney, Agent, or Firm* — Crowell & Moring LLP; John C. Freeman

(57) ABSTRACT

The disclosure may enable the mounting of a trim member and an end cap on a holder member to provide a flush fit and attractive door trim. Embodiments may enable the trim member and the end cap to be snapped onto the holder member without the need for any excessive force. The disclosed device and method may comprise mounting trim on refrigerator doors. Embodiments may include a support member that may be mounted on a side of the door, a holder member that may be mounted within the support member, a trim member that may be mounted on the holder member to cover at least a portion of the support member, and an end cap that may be mounted on the holder member to cover an end of the support member. The end cap may be disposed in engagement with the trim member to form co-planar surfaces for flush mounting.

32 Claims, 7 Drawing Sheets

(56) References Cited

U.S. PATENT DOCUMENTS

| | | | | |
|---|---|---|---|---|
| 4,745,656 A | * | 5/1988 | Revlett | F25D 23/028 16/DIG. 19 |
| 4,865,501 A | * | 9/1989 | Ferris | F16B 13/0808 24/453 |
| 4,926,523 A | * | 5/1990 | Carlson | F25D 23/028 16/412 |
| 5,623,124 A | * | 4/1997 | Chien | H02G 3/14 174/53 |
| 6,609,274 B2 | * | 8/2003 | Christensen | E05B 1/0015 312/405 |
| 8,108,972 B2 | * | 2/2012 | Bae | A47B 95/02 16/412 |
| 8,776,320 B2 | * | 7/2014 | Wing | A47B 95/02 16/412 |
| 10,995,978 B2 | * | 5/2021 | Lee | F25D 23/126 |
| 2003/0079313 A1 | * | 5/2003 | Pohl | F25D 23/028 16/436 |

* cited by examiner

Good Fit

Holder

DEVICE AND METHOD FOR MOUNTING DOOR TRIM

The present application claims priority under 35 U.S.C. § 119(e)(1) to U.S. Provisional Application No. 62/819,191, filed on Mar. 15, 2019, the entire contents of which is incorporated herein by reference.

This patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present disclosure relates in general to the field of door trims, and in particular to devices and methods for mounting trim on refrigerator doors.

BACKGROUND

Various components and methods for attaching trim to refrigerator doors are known in the art. One challenge with certain implementations is ensuring a tight fit between the visible components of the trim assembly in order to provide an aesthetically appealing door. Certain trim designs include end caps that are mounted on the ends of an underlying metal bracket that is mounted on the side of a refrigerator door. A plastic trim is forced unto the metal bracket to provide the finished product. A drawback of the manufacturing process for such trim assemblies is the inability to eliminate gaps between the plastic trim and the end caps that are both supported by the bracket. If the plastic trim is too long, the end caps cannot be properly mounted on the bracket. End caps forced against such trims may eventually pop off of the bracket, or cause the trim to bulge up and away from the bracket. As a result, the plastic trims are often manufactured slightly shorter than the anticipated space between the two end caps. This results in a gap between the trim and at least one of the end caps, which degrades the appearance of the refrigerator and lessens its appeal to many consumers.

Another drawback of such trim designs is apparent during the assembly process. The plastic trim must be forced onto the metal bracket. The rigidity of the plastic material, however, presents a challenge for assemblers. The exterior surface of the plastic trim needs to be hard enough to protect against any damage caused from the daily use of customers in the typical kitchen environment. Clips or tabs are typically located on the interior surface of the trim for securing the trim to the metal bracket. The clips on the trim are necessarily made of the same hard material as the exterior surface of the plastic trim, which is manufactured via an extrusion process. Due to the rigid nature of such plastic trims and metal brackets, it is difficult to assembly these components.

BRIEF SUMMARY

The present disclosure may be embodied in various forms, including without limitation a device and a method for mounting trim on refrigerator doors. Embodiment of the present disclosure may enable, among other things, the mounting of a trim member and an end cap on a holder member that provides a flush fit between the trim member and the end cap, resulting in an attractive door trim. Some embodiments of the present disclosure may include a holder member made of a flexible material that enables the trim member and the end cap to be slidably mounted on, and/or snapped onto, the holder member without the need for any excessive force.

In certain embodiments, a preexisting support member may already be mounted on the door, whether by screws, nails, adhesives or any other mounting means. When engaged with the holder member, the trim member and the end cap may snap into a tight-fit position to achieve a flush mounting without any gaps along the edge shared by the trim member and the end cap. The resulting friction-fit may keep the trim member and the end cap in the desired relative position with respect to the holder member, and therefore to the door. This friction may be facilitated by: snap-fit hooks that latch on, or lock into, recesses or openings; tabs or projections received and held within catches, such as c-clips; toothed-members that engage toothed-receivers that may enable members to slide towards each other at various distances, that may enable members to be advanced towards and/or away from each other, and/or that provide for incremental adjustments based on the width of the teeth on the toothed-members; or, any other restraining means adapted to receive slidable members.

In some embodiments, the trim may be side-trim that may be mounted on a side of a house appliance or a cabinet that contains a house appliance. In accordance with certain embodiments, the side-trim may be mounted on a side of a door or a door frame. The door may be a door mounted on a house appliance or a cabinet. The house appliance may be a refrigerator, freezer, oven, stove, dish washer, microwave, dryer, or washing machine.

Certain embodiments may include a support member that may be mounted on a side of the door. The support member may be U-shaped. A holder member may be mounted within, or upon, the support member. A trim member may be mounted on the holder member. In certain embodiments, the trim member may be slidably mounted upon the holder member. The trim member may cover at least a portion of the support member. The trim member may cover an aperture of the support member, in accordance with embodiments where the support member is U-shaped and has an aperture traversing an elongated side of the support member. An end cap may be mounted on the holder member. In certain embodiments, the end cap may be slidably mounted upon the holder member. The end cap may cover an end of the support member. The end cap may be disposed in engagement with the trim member to form co-planar surfaces for flush mounting.

In some embodiments, the holder member may include one or more snap-fit hooks that may engage the support member. A snap-fit hook may engage an opening in the support member. The opening may be located adjacent to an elongated edge of the support member. A second snap-fit hook may engage a second opening in the support member. The second opening may be located adjacent to an opposite elongated edge of the support member. Accordingly, the holder member may be securely mounted to the support member.

In certain embodiments, the holder member may include one or more snap-fit hooks that may engage the trim member. A snap-fit hook may engage a recess in the trim member. The recess may be located adjacent to an elongated edge of the trim member. A second snap-fit hook may engage a second recess in the trim member. The second recess may be located adjacent to an opposite elongated edge of the trim member. Therefore, both elongated edges of the trim member may be securely mounted to the holder member. Consequently, the trim member may be aligned to the side of the door. In certain embodiments, the first recess and the second recess are located at different depths within the trim member.

The trim member may include a tab that may engage the holder member. The tab may slidably engage a catch in the holder member. This tab-catch engagement may comprise a friction-fit. Accordingly, the trim member may be securely mounted to the holder member, and therefore to the side of the door.

The end cap may include toothed-members that may engage the holder member. The toothed-members may engage a toothed-receiver within the holder member. As a result, the end cap may be securely mounted to the holder member. In some embodiments, the holder member may include the toothed-member and the end cap may include the toothed-receiver.

In an embodiment of the present disclosure, a method for mounting side-trim on a refrigerator door may include the step of attaching a support member to a side of the refrigerator door. The support member may be U-shaped. The support member may define slots for screws to engage the side of the door. The method may further include the step of attaching a holder member within the support member. The holder member may include snap-fit hooks that may slide, and/or snap, onto the support member.

In addition, the method may include the step of attaching a trim member to the holder member. The trim member may cover at least a portion of the support member. The trim member may cover an aperture of the support member, in accordance with embodiments where the support member is U-shaped and has an aperture traversing an elongated side of the support member. The trim member may include a tab that may slide, and/or snap, into a catch of the holder member. Further, the method may include the step of attaching an end cap to the holder member. The end cap may cover an end of the U-shaped support member. The end cap may include toothed-members that may slide, and/or snap, into a receiver of the holder member. The end cap may be disposed in engagement with the trim member to form co-planar surfaces for flush mounting. In certain embodiments, the steps for attaching the trim member and the end cap to the holder member may comprise slidably mounting them upon the holder member.

In some embodiments, the toothed-members may include snap-fit hooks having a plurality of teeth adapted to engage corresponding teeth located within the receiver of the holder member. In accordance with certain embodiments, the method may include the step of adjusting a position of the end cap on the holder member relative to the trim member. The toothed-members of the end cap may be advanced or withdrawn within the receiver of the holder member.

The holder member may be manufactured via an injection molding process, in accordance with any of the embodiments. The trim member may be manufactured via an extrusion process. The holder member, the trim member and the end cap may be made of a plastic material. In certain embodiment, the trim member may be made of a metal material. The support member may be made of a metal material. The steps of attaching the holder member, the trim member and the end cap may be performed without the aid of any tools, by apply a force directly from a finger of an assembler.

BRIEF DESCRIPTION OF THE DRAWINGS

The foregoing and other objects, features, and advantages for embodiments of the present disclosure will be apparent from the following more particular description of the embodiments as illustrated in the accompanying drawings, in which reference characters refer to the same parts throughout the various views. The drawings are not necessarily to scale, emphasis instead being placed upon illustrating principles of the present disclosure.

DETAILED DESCRIPTION OF EMBODIMENTS OF THE INVENTION

Reference will now be made in detail to the embodiments of the present disclosure, examples of which are illustrated in the accompanying drawings.

Embodiments of the present disclosure may enable an end cap to be disposed in engagement with the trim member to form co-planar surfaces for flush mounting. A benefit of the present disclosure may include a refrigerator having doors with trim that is aesthetically appealing to consumers. Another benefit may include the quick, easy and inexpensive assembly of door trim that may be snapped together.

Due the variations in the extrusion process, the potential difference in the length of the trim pieces may vary by 0.125 inches. Accordingly, a further benefit of the present disclosure may include providing for a flush contact between the trim member and the end cap, despite the potential variations that are expected during the manufacturing of the trim member.

In some embodiment, the trim member may include portions having various depths. The depth of a trim member may include a step change. An advantage of the present disclosure may include that the snap-fit hooks of the holder member may engage recesses located at various depths within the trim member.

Figure 1:
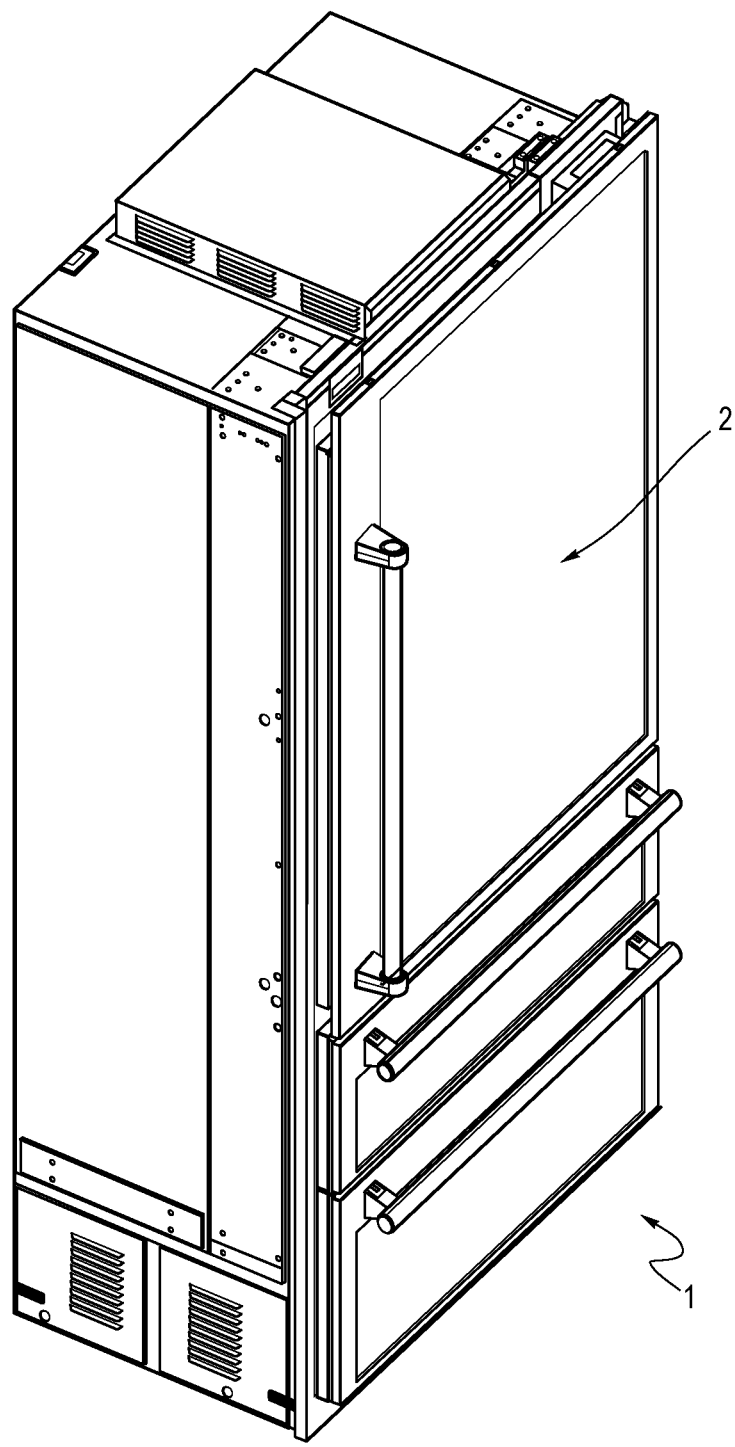
FIG. 1 is a drawing illustrating a perspective view of a refrigerator with a door, in accordance with certain embodiments of the present disclosure.
Figure 2:
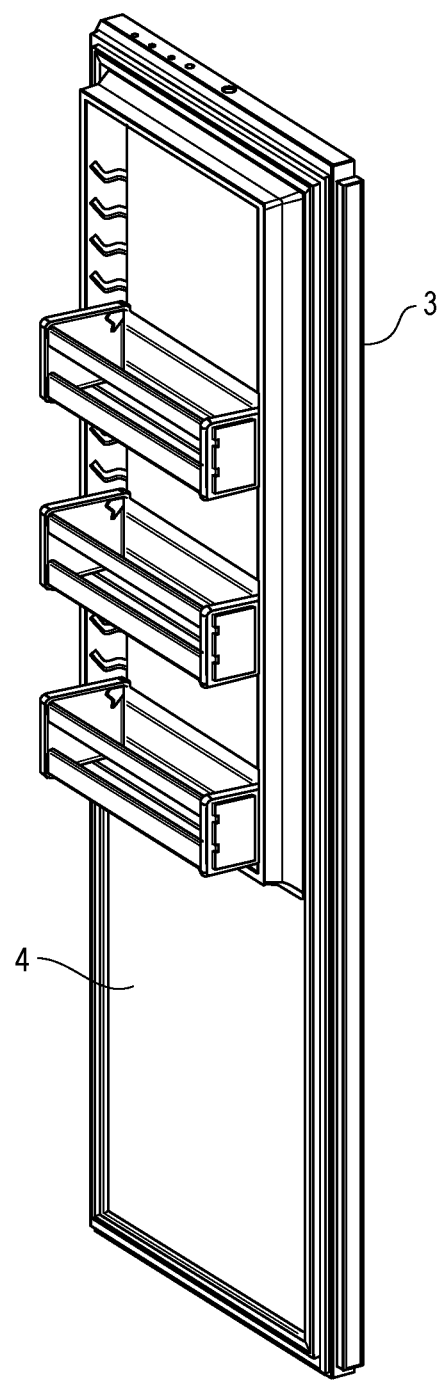
FIG. 2 is a drawing illustrating a perspective view of a refrigerator door with side trim, in accordance with certain embodiments of the present disclosure.
Figure 3:
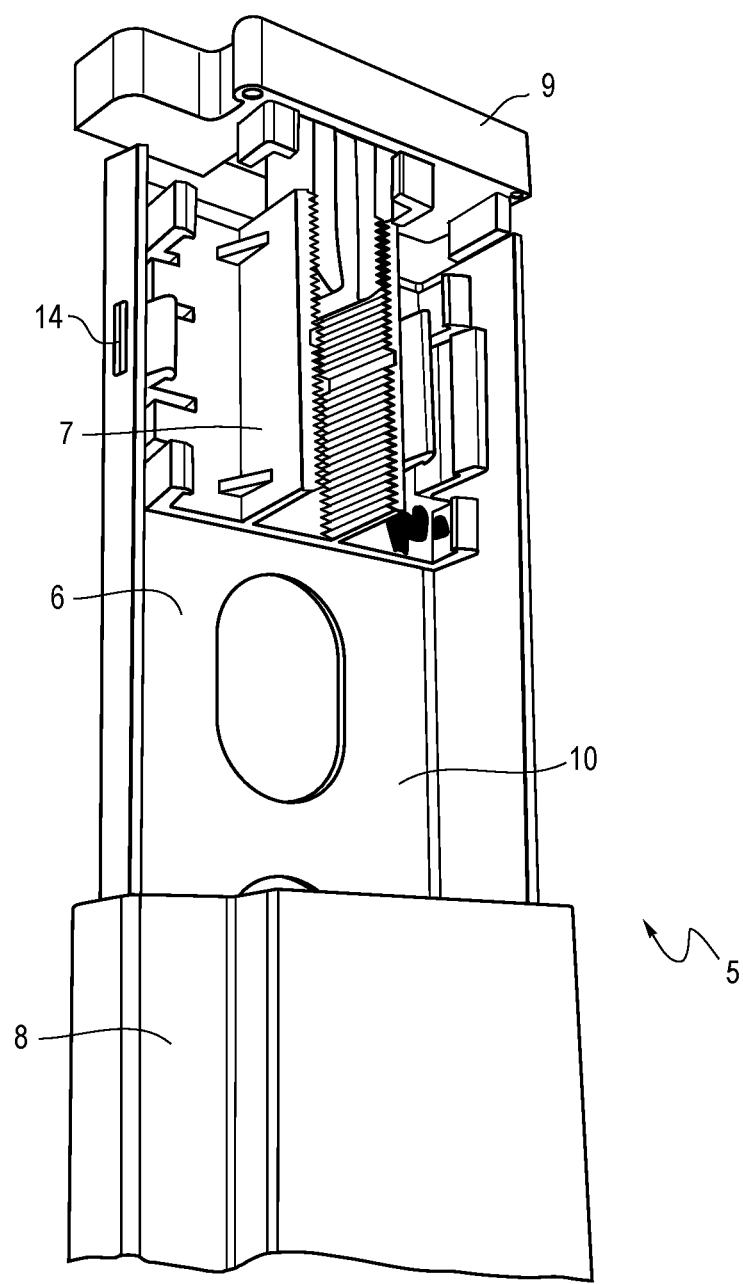
FIG. 3 is an image illustrating a perspective front view of a support member with a holder member, a trim member, and an end cap, in accordance with certain embodiments of the present disclosure.
Figure 4:
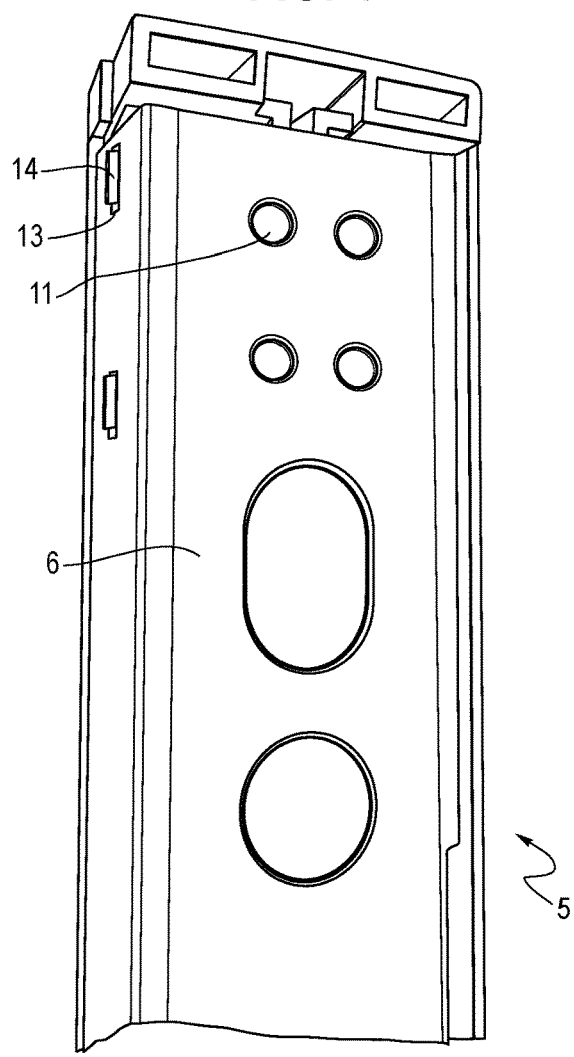
FIG. 4 is an image illustrating a perspective rear view of a support member with a holder member, a trim member, and an end cap, in accordance with certain embodiments of the present disclosure.
Figure 5:
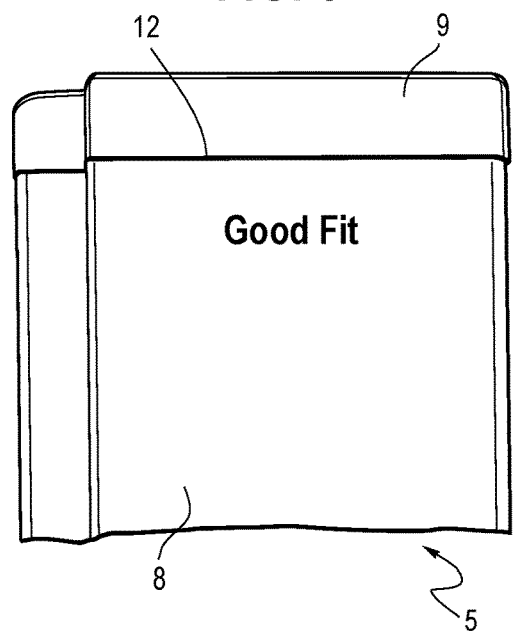
FIG. 5 is an image illustrating a perspective front view of an end cap disposed in engagement with an end of the trim member, in accordance with certain embodiments of the present disclosure.

FIG. 1 illustrates a refrigerator 1 with a door 2. As shown in FIG. 2, trim 3 may be mounted to the side mounting-surface that is perpendicular to the inner surface 4 of the refrigerator door 2. FIG. 3 illustrates an embodiment of a device 5 that includes a support member or support 6 that supports: a holder member or holder 7, a trim member or trim 8, and an end cap or cap 9. As shown, the support member 6 may define a U-shaped and the support member may define a U-shaped chamber 10. The rear of the support member 6 is displayed in FIG. 4. As shown, the support member 6 may include predrilled holes or slots 11 for screws (not shown) that secure the support member 6 to the refrigerator door 2. In some embodiments, the support member 6 may be mounted on the refrigerator door 2 using an adhesive. In certain embodiments, a preexisting support member 6 may already be mounted. The holder member 7 would be snapped into the support member 6, and the trim member 8 and the end cap 9 would snapped onto the holder member 7. Such an assembled device 5 would provide a good fit, as shown in FIG. 5, where the end cap 9 is disposed in engagement with the trim member 8 to form co-planar surfaces for a flush mounting 12. This novel trim design provides a gap-free fit for trim 3 mounted on any home appliance, including without limitation a refrigerator 1, or on any cabinet or housing for such appliances 1.

In some embodiments, the support member 6 may be mounted on a mounting-surface of a door 2 of any home appliance 1. The home appliance 1 may be a refrigerator 1. In other embodiments, the structure disclosed herein may be used in conjunction with other appliances 1 such as an oven, a dish washer. In other embodiments, the structure disclosed herein may be used in conjunction with other structures or devices that include doors or movable barriers or structures, such as cabinets. For the sake of brevity, the structure is specifically disclosed with respect to a refrigerator door 2, but one of ordinary skill after a thorough review of this specification will readily understand how disclosed structure may be used with other appliances 1 or other structures or devices without undue experimentation. The home appliance 1 may have a compartment (not shown). For example, the compartment of a refrigerator 1 is used to store food. The compartment may define an opening. The door 2 may open and close the opening. The mounting-surface of the door 2 may be perpendicular to an inner surface 4 of the door 2. The inner surface 4 may face the opening of the compartment of the home appliance 1. The support member 6 may be U-shaped, and the support member 6 may define an U-shaped chamber 10.

Figure 6:
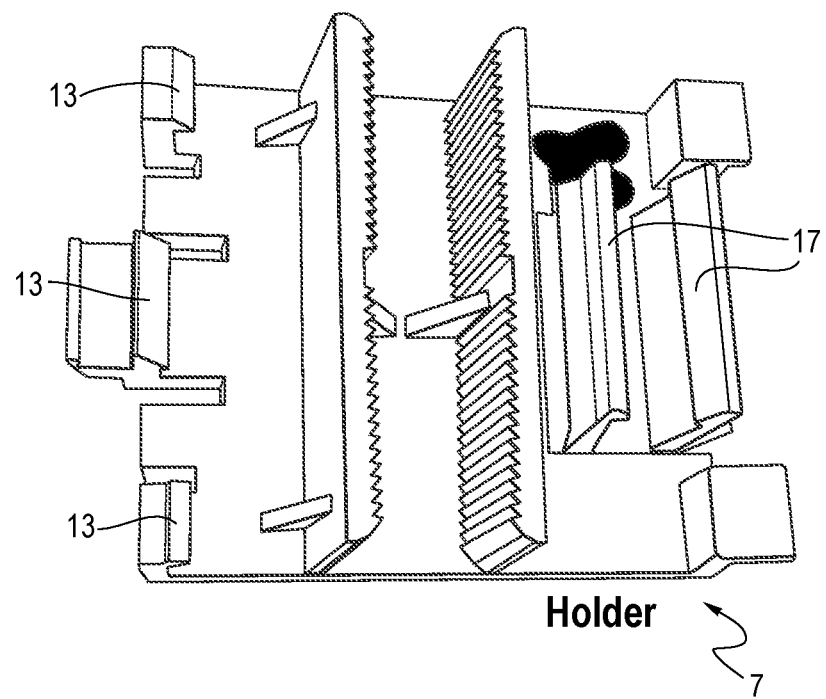
FIG. 6 is an image illustrating a perspective front view of a holder member, in accordance with certain embodiments of the present disclosure.
Figure 7:
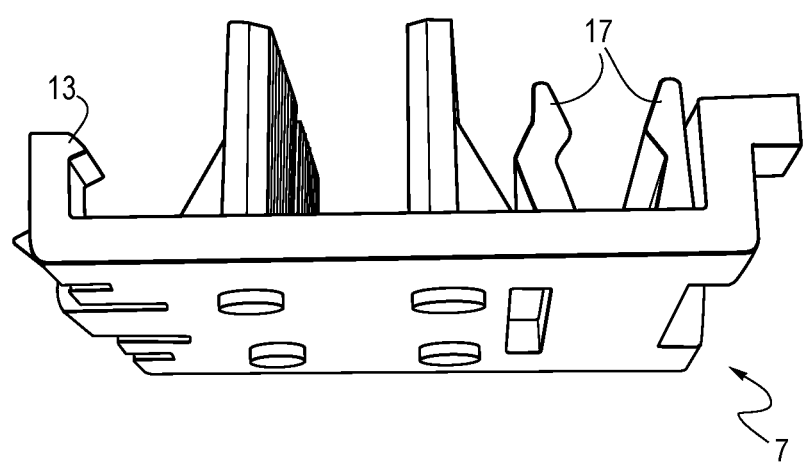
FIG. 7 is an image illustrating a perspective side view of a holder member, in accordance with certain embodiments of the present disclosure.

A holder member 7 may attach to such a support member 6. FIGS. 6-7 illustrate a holder member 7, in accordance with certain embodiments of the present disclosure. The holder member 7 may include snap-fit hooks 13. The support member 6 may define openings 14, and the snap-fit hooks 13 may lock into the openings 14. This engagement is shown in FIGS. 3-4. The holder member 7 may be securely attached within the U-shaped chamber 10 of the support member 6.

In some embodiments, the holder member 7 is attached adjacent to an end of the support member 6, and a second holder member 7 may be attached adjacent to the opposite end of the support member 6. In accordance with certain embodiments, the first holder member 7 may be slidably mounted on the support member 6 adjacent to the top end of the door 2, and the second holder member 7 may be slidably mounted on the support member 6 adjacent to the bottom end of the door 2. Accordingly, both ends of the trim member 8 may be securely attached to the support member 6 via two holder members 7, and therefore to the door 2.

Figure 8:
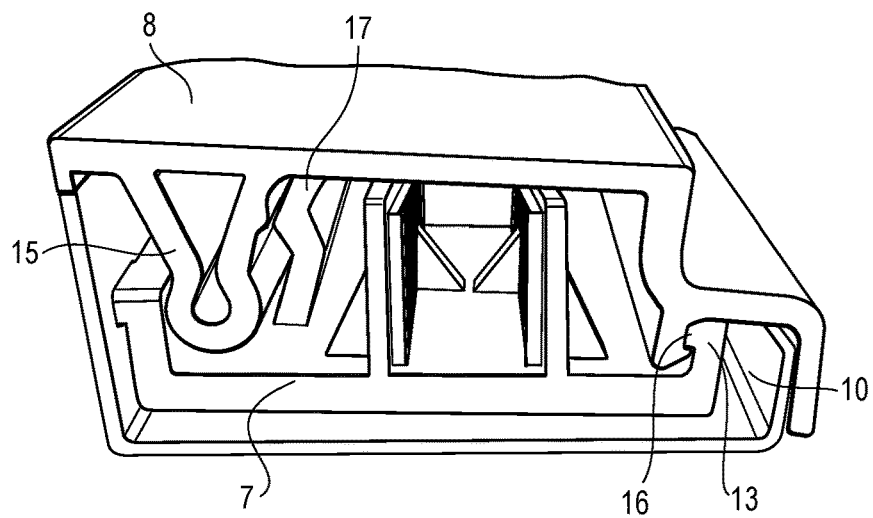
FIG. 8 is an image illustrating a perspective side view of a support member with a holder member, and a trim member, in accordance with certain embodiments of the present disclosure.

As shown in FIG. 8, a trim member 8 may engage such a holder member 7, and the trim member 8 may have one or more tabs 15 and one or more recesses 16. The holder member 7 may have one or more catches 17 that may receive any of the tabs 15 of the trim member 8. The holder member 7 may further have one or more snap-fit hooks 13 to lock into any of the recesses 16 of the trim member 8. The trim member 8 may be securely attached to the holder member 7. The trim member 8 may close an aperture of the U-shaped chamber 10 of the support member 6.

In certain embodiments, a tab 15 and its respective catch 17 may include various geometries. The shape for a portion of the cross-section of a tab 15 and/or a catch 17 may include, without limitation, the shape shown for tab 15 in FIG. 8 or any of the following shapes: arcuate, arrowhead, Christmas tree, lobate, auriculate, panduriform, lacerate, sagittate, hastate, rhombus, trapezoidal, kite, diamond, triangle, pentagon, hexagon, heptagon, or octagon.

Figure 9:
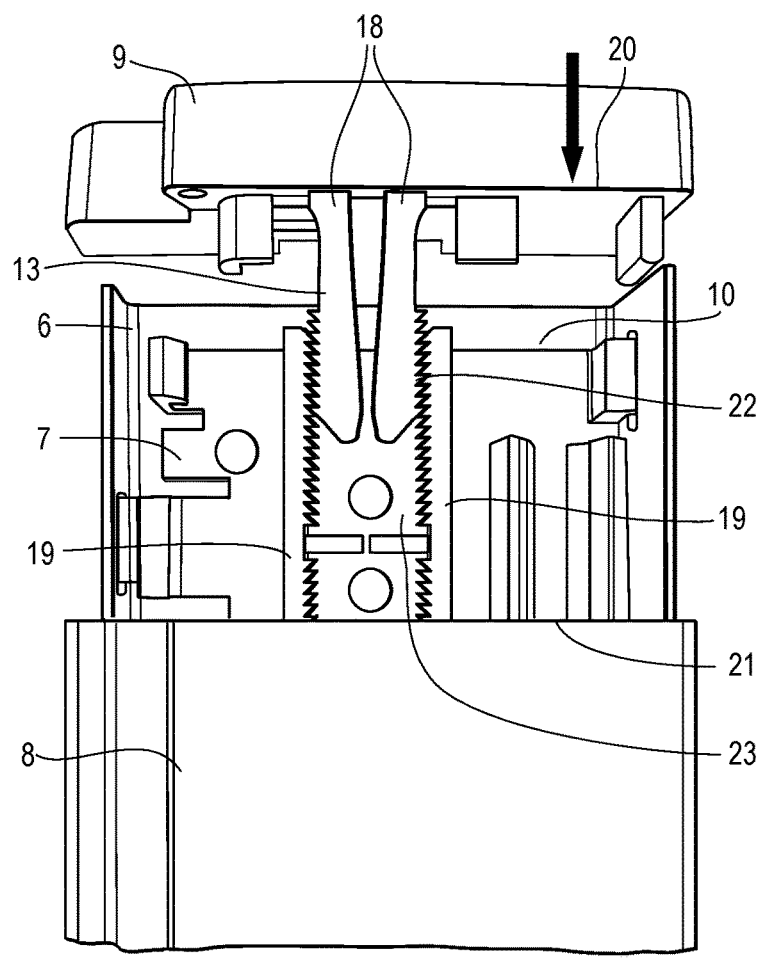
FIG. 9 is an image illustrating a front view of a support member with a holder member, a trim member, and an end cap, in accordance with certain embodiments of the present disclosure.

FIG. 9 illustrates how an end cap 9 may be mounted on such a holder member 7. The end cap 9 may have two or more toothed-members 18. The holder member 7 may have two or more corresponding toothed-receivers or receivers 19 that may engage the toothed-members 18. The end cap 9 may be securely attached to the holder member 7. The end cap 9 may close one end of the U-shaped chamber 10 of the support member 6. An inner edge 20 of the end cap 9 may be disposed in engagement with an end 21 of the trim member 8.

In some embodiments, a second end cap 9 may be attached to a second holder member 7 that is attached to the opposite end of the U-shaped chamber 10 of the support member 6. An inner edge 20 of the second end cap 9 may be disposed in engagement with the opposite end 21 of the trim member 8. Accordingly, each of the two end caps 9 may be flush mounted with a respective end of the trim member 8.

Each of the toothed-members 18 may comprise a snap-fit hook 13 having teeth 22. Such toothed-members 18 may face away from each other. Each of the toothed-receivers 19 may define two sides of a toothed-chamber 23. The inner surfaces of the two sides of the toothed-chamber 23 may have corresponding teeth 22 that may engage the teeth 22 of the toothed-members 18. The end cap 9 may be incrementally adjustable towards and away from the trim member 8. The toothed-members 18 of the end cap 9 may be advanced towards the corresponding toothed-receivers 19 of the holder member 7. The advancement may be incremental based on the further engagement of the teeth 22 of the toothed-members 18 with the corresponding teeth 22 of the toothed-receivers 19. The distance of each incremental advancement is a function of the width of the teeth 22 on the toothed-members 18 and the teeth 22 on the toothed-receivers 19, and specifically the spacing therebetween, which invite receipt of teeth from the opposite engaging component.

The end cap 9 may be moved towards and away from the trim member 8. The toothed-members 18 of the end cap 9 may be compressed and then withdrawn away from the corresponding toothed-receivers 19 of the holder member 7. The toothed-members 18 of the end cap 9 may be compressed when the U-shaped chamber 10 of the support member 6 is open so that the toothed-members 18 are accessible.

Certain embodiments may include a device for mounting trim on a home appliance 1. A support member 6 may be mounted on a home appliance 1, or on a door 2 that is mounted or adapted to be mounted on a home appliance 1. The support member 6 may be mounted on a side of the door 2, or directly to a side of the home appliance 1. Two holder members 7 may be mounted within, or on, the support member 6. A trim member 8 may be slidably mounted upon the two holder members 7. One end of the trim member 8 may be mounted on the first holder member 7, and the opposite end of the trim member 8 may be mounted on the second holder member 7. Two end caps 9 may be slidably mounted upon the two holder members 7. Each holder member 7 may be adapted to support one of the two end caps 9.

The trim member 8, which may be mounted to the two holder members 7, may be selected from a set of trim members 8. The set of trim members 8 may have a length range (not shown). In some embodiments, the length range may comprise the difference between the longest trim member 8 and the shortest trim member 8 in the set of trim members 8. The set of trim members 8 may include trim members 8 that may be mounted on a door 2 for a particular home appliance. The length range may be based on variations in the extrusion process for the set of trim members 8.

The end caps 9 may be adapted to have an adjustment range (not shown). The adjustment range may represent the various distances that an end cap 9 may be slidably moved on a holder member 7. This slidable movement of the end caps 9 may be parallel to an elongated edge of the support member 6. In some embodiments, the adjustment range may comprise the difference between the position of an end cap 9 when it initially engages the holder member 7 and the position of the end cap 9 when it is fully disposed on the holder member 7. In certain embodiments, an end cap 9 is fully disposed on a holder member 7 when an inner edge of the end cap 9 is disposed in engagement with a portion of the support member 6 so that the end cap 9 cannot further advance towards the holder member 7.

Each of the end caps 9 may comprise a toothed-member 18 having teeth 22. Each of the holder members 7 may comprise a toothed-receiver 19 having corresponding teeth 22. The teeth 22 may be adapted to engage the corresponding teeth 22. In some embodiments, the adjustment range may be based the engagement of the two sets of teeth 22: the teeth 22 of the toothed-members 18 of the end caps 9, and the corresponding teeth 22 of the toothed-receivers 19 of the holder members 7. A toothed-member 18 may be inserted into a toothed-receiver 19 at various depths. In certain embodiments, the adjustment range of an end cap 9 may comprise the difference between the position of the end cap 9 when a toothed-member 18 initially engages the toothed-receiver 19 and the position of the end cap 9 when it is fully disposed on the holder member 7.

In certain embodiments, the length range of the trim member 8 may be less than the adjustment range of the end caps 9. The end caps 9 may be incrementally adjusted towards, or away from, each other in order to compensate for the amount of variation in the length of the trim member 8. Based on variations for certain extrusion processes, the potential difference in the length for some trim members 8 may vary up to 0.125 inches. One or both of the end caps 9 may be adjusted to accommodate longer and shorter trim members 8. Each end cap 9 may be disposed in engagement with an end of the trim member 8 to form co-planar surfaces for flush mounting.

Some embodiments may include a method for mounting trim on a home appliance 1. In certain embodiments, the method may include the step of mounting a support member 6 on a home appliance 1. The method may include the step of mounting two holder members 7 on the support member 6. Further, the method may include the step of mounting a trim member 8 on the two holder members 7. The trim member 8 may be configured to slidably move on the two holder members 7. This slidable movement of the trim member 8 may be parallel to an elongated edge of the support member 6.

In addition, the method may include the step of mounting a first end cap 9 and a second end cap 9 on the holder members 7. Each of the holder members 7 may support one of the two end caps 9. The end caps 9 may be configured to slidably move on the holder members 7. This slidable movement of the end caps 9 may be parallel to the elongated edge of the support member 6. Each of the end caps 9 may comprise a toothed-member 18 having teeth 22. Each of the holder members 7 may comprise a toothed-receiver 19 having corresponding teeth 22. The teeth 22 may engage the corresponding teeth 22. The end caps 9 may have an adjustment range. The adjustment range may be partially based on the engagement the teeth 22 with the corresponding teeth 22. The adjustment range may represent the various depths that a toothed-member 18 may be inserted into a toothed-receiver 19. Accordingly, the end caps 9 may be disposed in engagement with the trim member 8 to form co-planar surfaces for flush mounting.

In certain embodiments, the step of mounting the support member 6 on the home appliance 1 may comprise mounting the support member 6 on a door 2 of the home appliance 1. The door 2 may be mounted on the home appliance 1. Certain embodiments include the step of adjusting the trim member 8. Accordingly, the trim member 8 may cover the support member 6.

In some embodiments, the method may include the step of adjusting the first end cap 9. The first end cap 9 may be moved towards a first end of the trim member 8. As a result, an inner edge of the first end cap 9 may be disposed in engagement with the first end of the trim member 8. In certain embodiments, the method may include the step of adjusting the second end cap 9. The second end cap 9 may be moved towards a second end of the trim member 8. Accordingly, an inner edge of the second end cap 9 may be disposed in engagement with the second end of the trim member 8.

Figure 10:
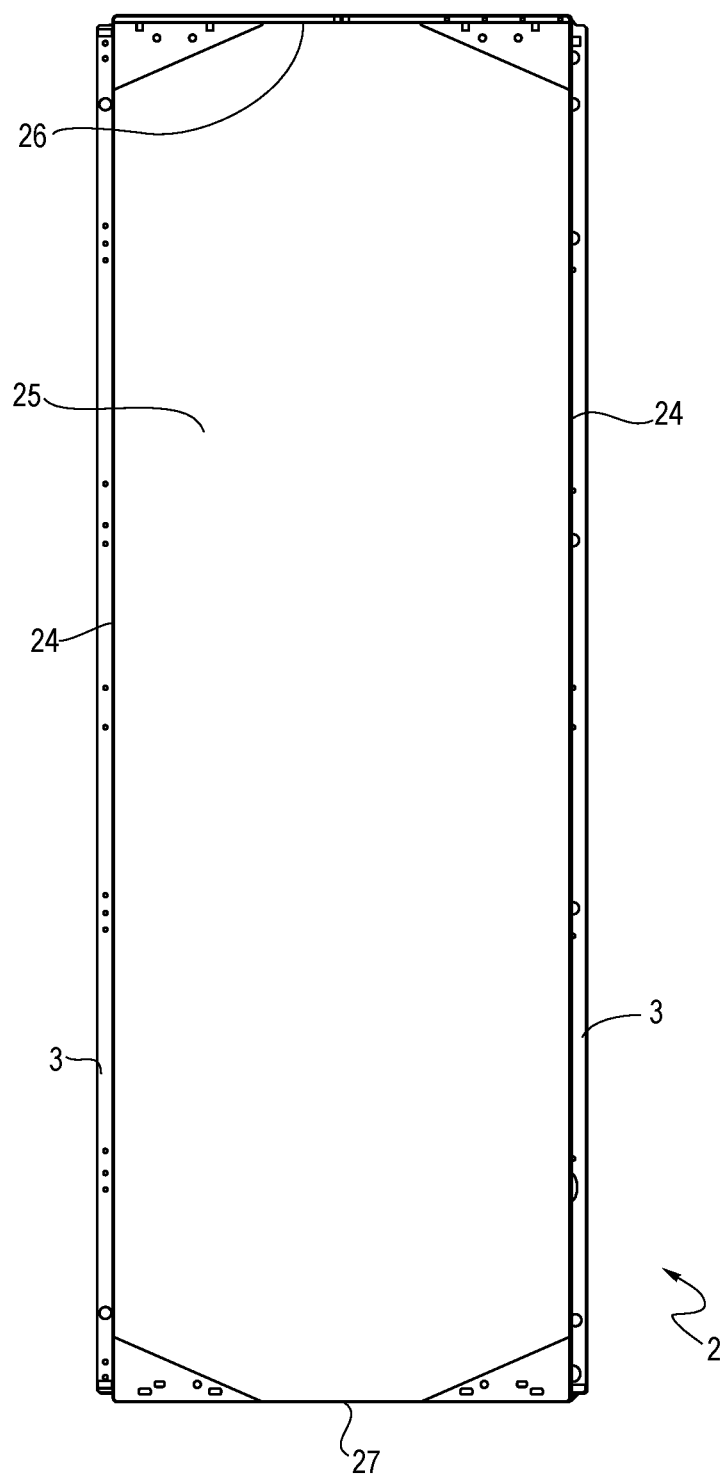
FIG. 10 is a drawing illustrating a perspective view of a door with two side trims mounted on side surfaces of the door, in accordance with certain embodiments of the present disclosure.

FIG. 10 illustrates how two trims 3 may be mounted on two side surfaces 24 of a door 2. In accordance with the above disclosures, an embodiment may include a first trim 3 that may be mounted on a first side surface 24 of a door 2. Similarly, a second trim 3 may be mounted on a second side surface 24 of the door 2. The first and the second side surfaces 24 may be on opposite sides of the door 2. In certain embodiments, the first and the second side surfaces 24 may be perpendicular to the outer surface 25 of the door 2. In some embodiments, a trim 3 may be mounted on a top surface 26 and/or a bottom surface 27 of a door 2. The door 2 may cover an opening of a compartment of a home appliance 1.

While the present disclosure has been particularly shown and described with reference to an embodiment thereof, it will be understood by those skilled in the art that various changes in form and details may be made therein without departing from the spirit and scope of the present disclosure. Although some of the drawings illustrate a number of operations in a particular order, operations that are not order-dependent may be reordered and other operations may be combined or broken out. While some reordering or other groupings are specifically mentioned, others will be apparent to those of ordinary skill in the art and so do not present an exhaustive list of alternatives.

What is claimed is:

1. A device for mounting trim on a door of a home appliance, comprising:
    a support member adapted to be mounted on a mounting-surface of the door, the home appliance having a compartment, the compartment defining an opening, the door configured to open and close the opening, the mounting-surface of the door is perpendicular to an inner surface of the door, the inner surface facing the opening of the compartment of the home appliance, the support member is U-shaped, the support member defining an U-shaped chamber;
    a holder member adapted to attach to the support member, the holder member having a plurality of snap-fit hooks, the support member defining a plurality of openings, the plurality of snap-fit hooks are adapted to lock into the plurality of openings, whereby the holder member is securely attached within the U-shaped chamber of the support member;
    a trim member adapted to engage the holder member, the trim member having at least one tab and at least one recess, the holder member having at least one catch adapted to receive the at least one tab of the trim member, the holder member further having at least one snap-fit hook adapted to lock into the at least one recess of the trim member, whereby the trim member is securely attached to the holder member, the trim member configured to close an aperture of the U-shaped chamber of the support member; and,
    an end cap adapted to be mounted on the holder member, the end cap having at least two toothed-members, the holder member having at least two corresponding toothed-receivers adapted to engage the at least two toothed-members, whereby the end cap is securely attached to the holder member, the end cap configured to close at least an end of the U-shaped chamber of the support member, whereby an inner edge of the end cap is adapted to be disposed in engagement with an end of the trim member.

2. The device of claim 1, wherein each of the at least two toothed-members comprise a snap-fit hook having a plurality of teeth, wherein the two toothed-members facing away from each other, wherein each of the at least two corresponding toothed-receivers define two sides of a toothed-chamber, and wherein inner surfaces of the two sides of the toothed-chamber have a corresponding plurality of teeth adapted to engage the plurality of teeth of the two toothed-members.

3. The device of claim 2, wherein the end cap is capable of incremental adjustments towards the trim member, wherein the at least two toothed-members of the end cap are adapted to advance towards the at least two corresponding toothed-receivers of the holder member, and wherein the advancement is incremental based on a further engagement of the plurality of teeth of the two toothed-members with the corresponding plurality of teeth of the two corresponding toothed-receivers.

4. The device of claim 1, wherein the end cap is capable of moving towards and away from the trim member, wherein the at least two toothed-members of the end cap are adapted to be compressed and withdrawn away from the at least two corresponding toothed-receivers of the holder member, and wherein the at least two toothed-members of the end cap are adapted to be compressed when the aperture of the U-shaped chamber of the support member is in an open state.

5. The device of claim 1, wherein the holder member is manufactured via an injection molding process, and wherein the trim member is manufactured via an extrusion process.

6. The device of claim 1, wherein the holder member, the trim member and the end cap are made of a plastic material, and wherein the support member is made of a metal material.

7. The device of claim 1, wherein the trim member is made of a metal material.

8. The device of claim 1, wherein the end of the trim member and the inner edge of the end cap form co-planar surfaces for flush mounting.

9. The device of claim 1, wherein the home appliance is a refrigerator.

10. A device for mounting side-trim on a door of a home appliance, comprising:
    a support member adapted to be mounted on a side of the door;
    a holder member adapted to be mounted within the support member;
    a trim member adapted to be slidably mounted upon the holder member, the trim member configured to cover at least a portion of the support member; and,
    an end cap adapted to be slidably mounted upon the holder member, the end cap configured to cover an end of the support member, whereby the end cap is adapted to be disposed in engagement with an end of the trim member to form co-planar surfaces for flush mounting.

11. The device of claim 10, wherein the support member is U-shaped, and wherein the trim member is configured to cover an aperture of the U-shaped support member.

12. The device of claim 10, wherein the holder member comprises at least one snap-fit hook adapted to engage the support member, wherein the snap-fit hook engages an opening in the support member, wherein the opening is adjacent to an elongated edge of the support member, wherein a second snap-fit hook engages a second opening in the support member, and the second opening is adjacent to an opposite elongated edge of the support member, whereby the holder member is securely mounted to the support member.

13. The device of claim 10, wherein the holder member comprises at least one snap-fit hook adapted to engage the trim member, wherein a snap-fit hook engages a recess in the trim member, and wherein the recess is adjacent to an elongated edge of the trim member.

14. The device of claim 13, wherein a second snap-fit hook engages a second recess in the trim member, and wherein the second recess is adjacent to an opposite elongated edge of the trim member, whereby both elongated edges of the trim member are securely mounted to the holder member, whereby the trim member is aligned to the side of the door.

15. The device of claim 14, wherein the first recess and the second recess are located at different depths within the trim member.

16. The device of claim 10, wherein the trim member comprises a tab adapted to engage the holder member, wherein the tab slidably engages a catch in the holder member, wherein the tab-catch engagement comprises a friction-fit, whereby the trim member is securely mounted to the holder member, whereby the trim member is securely mounted to the side of the door.

17. The device of claim 16, wherein a shape of the tab is selected from a group of shape consisting of: arcuate, arrowhead, Christmas tree, lobate, auriculate, panduriform, lacerate, sagittate, hastate, rhombus, trapezoidal, kite, diamond, triangle, pentagon, hexagon, heptagon, and octagon.

18. The device of claim 10, wherein the end cap comprises toothed-members adapted to engage the holder member, wherein the toothed-members engage a toothed-receiver within the holder member, whereby the end cap is securely mounted to the holder member.

19. The device of claim 10, further comprising:
a second holder member adapted to be mounted within the support member, wherein the first holder member is adapted to be mounted adjacent to a first end of the support member, wherein the first end is the end of the support member covered by the end cap, wherein the second holder member is adapted to be mounted adjacent to a second end of the support member, wherein the first end of the support member is adapted to be mounted adjacent to a top end of the door, wherein the second end of the support member is adapted to be mounted adjacent to a bottom end of the door; and,
a second end cap adapted to be slidably mounted upon the second holder member, the second end cap configured to cover the second end of the support member, whereby the second end cap is adapted to be disposed in engagement with an second end of the trim member to form co-planar surfaces for flush mounting, and wherein the second end of the trim member is adapted to be slidably mounted upon the second holder member, whereby both ends of the trim member are securely attached to the door.

20. A method for mounting side-trim on a door of a home appliance, comprising:
attaching a support member to a side of the door, wherein the support member defines slots adapted for screws to engage the side of the door;
attaching a holder member within the support member, wherein the holder member comprises a plurality of snap-fit hooks adapted to snap onto the support member;
attaching a trim member to the holder member, wherein the trim member is configured to cover at least a portion of the support member, and wherein the trim member comprises a tab adapted to snap into a catch of the holder member; and,
attaching an end cap to the holder member, wherein the end cap is configured to cover an end of the support member, wherein the end cap comprises toothed-members adapted to snap into a receiver of the holder member, and whereby the end cap is disposed in engagement with the trim member to form co-planar surfaces for flush mounting.

21. The method of claim 20, wherein the toothed-members comprise snap-fit hooks comprising a plurality of teeth adapted to engage a corresponding plurality of teeth located within the receiver of the holder member.

22. The method of claim 20, further comprising:
adjusting a position of the end cap on the holder member relative to the trim member, wherein the toothed-members of the end cap are advanced or withdrawn within the receiver of the holder member.

23. The method of claim 20, wherein the holder member is manufactured via an injection molding process, and wherein the trim member is manufactured via an extrusion process.

24. The method of claim 20, wherein the holder member, the trim member and the end cap are made of a plastic material, and wherein the support member is made of a metal material.

25. The method of claim 20, wherein the attaching the holder member, the trim member and the end cap are performed by apply a force directly from a finger of an assembler.

26. A device for mounting trim on a home appliance, comprising:
a support member adapted to be mounted on a home appliance;
two holder members adapted to be mounted within the support member;
a trim member adapted to be slidably mounted upon the two holder members; and,
a first end cap and a second end cap adapted to be slidably mounted upon the two holder members, each of the holder members adapted to support one of the two end caps, each of the end caps comprises a toothed-member having teeth, each of the holder members comprises a toothed-receiver having corresponding teeth, the teeth adapted to engage the corresponding teeth, whereby each end cap is adapted to be disposed in engagement with an end of the trim member to form co-planar surfaces for flush mounting.

27. The device of claim 26, wherein the trim member comprises one of a plurality of trim members having a length range, wherein each of the end caps are adapted to have an adjustment range, wherein the length range of the trim member is less than the adjustment range of the end caps.

28. A method for mounting trim on a home appliance, comprising:
mounting a support member on a home appliance;
mounting two holder members on the support member;
mounting a trim member on the two holder members, wherein the trim member is configured to slidably move on the two holder members, wherein the slidable movement of the trim member is parallel to an elongated edge of the support member; and,
mounting a first end cap and a second end cap on the holder members, wherein each of the holder members supports one of the two end caps, wherein the end caps are configured to slidably move on the holder members, wherein the slidable movement of the end caps is parallel to the elongated edge of the support member, wherein each of the end caps comprises a toothed-member having teeth, wherein each of the holder members comprises a toothed-receiver having corresponding teeth, wherein the teeth engage the corresponding teeth, whereby the end caps are disposed in engagement with the trim member to form co-planar surfaces for flush mounting.

29. The method of claim 28, wherein mounting the support member on the home appliance comprises mounting the support member on a door of the home appliance, wherein the door is mounted on the home appliance.

30. The method of claim 28, further comprising:
adjusting the trim member, whereby the trim member covers the support member.

31. The method of claim 28, further comprising:
adjusting the first end cap, wherein the first end cap is moved towards a first end of the trim member, whereby an inner edge of the first end cap is disposed in engagement with the first end of the trim member.

32. The method of claim 31, further comprising:
adjusting the second end cap, wherein the second end cap is moved towards a second end of the trim member, whereby an inner edge of the second end cap is disposed in engagement with the second end of the trim member.

\* \* \* \* \*